United States Patent Office 2,935,495
Patented May 3, 1960

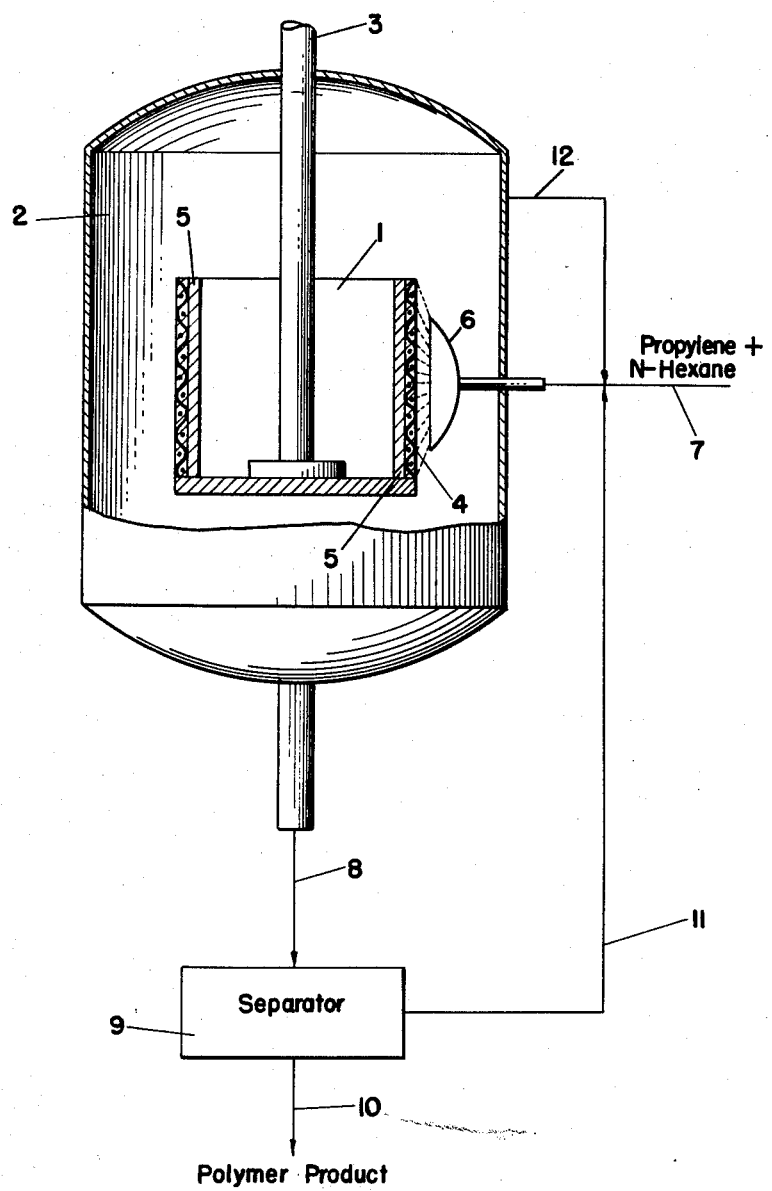

2,935,495
MANUFACTURE OF POLYOLEFINS

Robert M. Kennedy, Newtown Square, Pa., assignor to Sun Oil Company, Philadelphia, Pa., a corporation of New Jersey Application November 27, 1956, Serial No. 624,698

6 Claims. (Cl. 260—88.2)

This invention relates to the preparation of polymers of normally gaseous olefins, and particularly relates to the preparation of solid polymers of ethylene, solid polymers of propylene, and solid copolymers of ethylene and propylene.

Normally gaseous olefins can be polymerized by a variety of catalysts. A catalyst which is especially effective for the polymerization of normally gaseous olefins to relatively high molecular weight, solid polymers is the combination of a lower halide of titanium, such as titanium trichloride and an aluminum trialkyl, such as aluminum triethyl. This catalyst can be prepared by admixing, for example, titanium tetrachloride and aluminum triethyl in an inert liquid such as isooctane. On admixing the two components, a finely divided solid phase is formed as a dispersion in the inert liquid. The solids of the dispersion are catalysts for polymerizing normally gaseous olefins to solid polymers. If desired, a lower halide such as titanium trichloride can be preformed, dispersed in an inert liquid, and an activator such as an aluminum trialkyl added. Such catalysts are deactivated by contact with water or oxygen, and hence such materials must be excluded from contact therewith. In performing the polymerization step, a normally gaseous olefin is passed through a suspension of the finely divided solid in the inert liquid reaction medium and is therein polymerized to solid polymers. Other materials can be substituted for titanium tetrachloride and/or aluminum triethyl, as hereinafter described.

However, in this process, the solid polymer product is intimately associated with the solid catalyst particles. The separation of polymer from catalyst is extremely difficult. Means heretofore described for separating catalyst from polymer involve grinding the polymer-catalyst in the presence of a catalyst deactivating material such as water or alcohol to expose portions of the catalyst particles to the action of such deactivating material, and simultaneously or subsequently extracting the deactivated catalyst from the polymer. This separation means is unsatisfactory in that removal of even a major proportion of the catalyst is difficult and the catalyst is deactivated. Hence, such processes of necessity are batch-type and expensive.

An object of the present invention is to provide a process for the preparation of solid polymers of normally gaseous olefins using solid catalyst particles which are destroyed by contact with water or oxygen, in which the polymer is separated from catalyst without deactivating the catalyst. A specific object of the invention is to provide a continuous process for the preparation of polypropylene using a solid catalyst in which polymer is separated, continuously or intermittently, from the catalyst. Other objects and their achievement in accordance with the process of the invention will be apparent hereinafter.

It has now been found, in the preparation of solid polymers of normally gaseous olefins involving the use of solid catalyst particles as above described, that by orienting polymer growth outwardly from a catalyst bed composed essentially of the solid catalyst particles and an activator therefor, the polymer chains can be cleaved at a location adjacent the catalyst surface so that the cleaved polymer is free from contamination by catalyst particles, and the catalyst is active for further, or continued, olefin polymerization.

Ethylene, propylene, and mixtures of ethylene and propylene are the normally gaseous olefins which can be polymerized in accordance with the process of the present invention. Such olefins can be from any source, such as from petroleum refinery streams, the dehydration of alcohols, or the like. Saturated hydrocarbons such as ethane and propane can be present and act as diluents.

In accordance with an embodiment of the process of the invention, a bed of catalyst particles is formed on the periphery of a basket centrifuge. The basket sides are preferably formed of a fine mesh screen so that particles of catalyst are held therein during rotation of the basket. With the centrifuge rotating, a normally gaseous olefin is contacted with the outer surface of the centrifuge. As the molecules grow, the polymer chains are oriented outwardly from the catalyst surface due to centrifugal force. When the polymer chains reach a substantial size, which can be a predetermined size, the polymer chain is cleaved at a location adjacent the catalyst surface. The polymer is thereby removed from the catalyst and the catalyst surface remains active for additional olefin polymerization.

The catalyst bed is formed on or applied to the inner surface of the centrifuge basket. The catalysts of the invention are solid particles formed by the reduction of a halide or salt of a metal of the left hand side of groups IV, V, or VI of the periodic table. Preferably, a halide or salt of titanium, zirconium, hafnium, vanadium, niobium, chromium, molybdenum or tungsten is used. The metal of the metal compound must be in a valence state other than its highest valence state. The reduction of such a metal compound, such as titanium tetrachloride, can be accomplished by any convenient means, such as by contacting with a dispersion of an alkali metal in a solvent, or by contacting with an aluminum trialkyl. In any event, it is necessary that an activator, such as an aluminum trialkyl, be present as a component of the catalyst, and it is convenient in many instances to employ such a compound as both the reducing agent and the activator. However, the use of a pre-reduced compound, such as $TiCl_3$, $TiCl_2$, or a mixture thereof, together with an activator, gives excellent results. Materials which can be used as the activator, in addition to aluminum trialkyls, include other metal alkyls, metal hydrides, metal borohydrides, and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethylmagnesium chloride, phenylmagnesium bromide, and the like.

The inert liquid medium containing finely divided solid catalyst can be introduced into the centrifuge with the basket rotating so that a catalyst bed is formed on the wire mesh basket side, the inert liquid being removed through the basket walls. The centrifuge basket, during this step and throughout the process of the invention, is maintained in an anhydrous, oxygen-free environment. The catalyst is maintained wet with an inert liquid medium, such as by spraying the liquid medium thereon from one or more spray nozzles at low liquid velocity so that the catalyst bed is not disturbed. The normally gaseous olefin is contacted with the catalyst bed while the centrifuge basket is rotating. The olefin can be dissolved in the inert liquid medium applied through the spray-heads, or it can be applied in gas phase by simply introducing into the confined space containing the centrifuge basket. Polymerization is initiated at the outer catalyst surface and continues with polymers oriented outwardly from the catalyst bed, due to centrifugal force, so that the polymers extend through the perforations in the centrifuge basket. The speed of rotation of the basket can be varied to secure optimum results, as hereinafter described. Polymer may also form on the inner catalyst surface, although such surface can be blocked from contact with the olefin if desired. When polymer forms on the inner surface of the catalyst, such surface is soon blocked by the polymer from contact with additional quantities of olefin so that the polymer growth thereon is limited.

The polymerization reaction is performed under polymerizing conditions of temperature and pressure. The temperature can be varied from about 0° C. to about 170° C., and ambient temperature gives good results. The pressure is advantageously atmospheric or above, and a pressure of from about 10 to 5,000 p.s.i.g. (pounds per square inch gauge) gives good results. The pressure is conveniently regulated by maintaining an atmosphere of the olefin being polymerized under the desired pressure.

Saturated hydrocarbons are preferably used as the inert, liquid reaction medium. Paraffins such as the hexanes, heptanes, octanes, decanes, and mixtures thereof give good results. Cycloparaffins such as the cyclopentanes, and cyclohexanes, and mixtures thereof with each other and with paraffins also give good results.

The polymer products can be removed from the catalyst bed by a variety of means. For example, the speed of rotation of the basket can be adjusted so that the polymer is cleaved from the catalyst surface when the chain length has reached a given length, and hence a given weight. An alternative method of operating is to rotate the basket at a relatively slow speed sufficient only to orient the polymers outwardly from the catalyst bed. At intervals, the speed of rotation is increased so that the polymers of substantial chain length are cleaved from the catalyst bed. The speed of the basket is then decreased for additional polymerization. In this embodiment of the invention, the wire gauze basket can be supported by a heavier wire mesh, if desired, and this support is especially valuable where the centrifuge is operated at relatively high speeds.

The polymer product can also be removed from the bed by positioning a doctor blade adjacent the outer surface of the centrifuge basket. In this embodiment, when the polymers have reached a sufficient size, impingement on the doctor blade causes cleavage of the polymer molecule thereby separating polymer free from catalyst, while leaving the catalyst active for additional polymerization. To assist this operation, it is advantageous to select wire mesh of a size so that the catalyst particles employed are firmly seated in the mesh openings and present a surface substantially coextensive with the outer surfaces of the wire mesh. In some instances it is advantageous to position the doctor blade in light contact with the wire gauze of the basket so that a scissors effect is exerted on the polymers thereby assisting in their cleavage.

Attention is now directed to the accompanying figure which illustrates an embodiment of the invention.

Centrifuge basket 1 having wire mesh walls 4 is positioned in container 2 and is rotatable by means of shaft 3. Catalyst bed 5 is formed on, and in the interstices of, wall 4. Spray-head 6 supplies a normally gaseous olefin such as propylene dissolved in an inert medium such as n-hexane by spraying, at low liquid velocities, a solution of propylene in n-hexane directly on the outer surface of the catalyst bed, the solution being supplied through line 7. A multiplicity of spray-heads 6 positioned around basket 1 can be employed if desired. The growth of polymer chains are initiated at the outer surface of catalyst bed 5. As the polymer chain grows, the rotation of centrifuge basket 1 orients the polymer growth outwardly from catalyst bed 5 and through wire mesh 4. When the polymer size is sufficiently large, centrifugal force causes cleavage of the chain at a location adjacent the catalyst surface so that polymer is removed from the catalyst surface and is recovered from container 2 through line 8. From line 8, polymer and n-hexane pass into separator 9. Polymer product is separated through line 10. N-hexane is recycled to the process through lines 11 and 7. Additional propylene can be supplied, if desired, to container 2 to provide an inert atmosphere, to insure the presence of sufficient propylene to obtain rapid polymerization, and to regulate the pressure in container 2. Unreacted propylene, if any, can be recovered from container 2 through line 12 and recycled to the process through lines 12 and 7.

In operating the process, a suspension of catalyst particles and an activator therefor in an inert reaction medium is prepared. This can be accomplished, for example, by admixing titanium tetrachloride and aluminum triethyl in an inert liquid such as isooctane or n-hexane. If desired, preformed particles of titanium trichloride can be dispersed in a liquid medium and an activator such as aluminum triethyl or aluminum triisopropyl added thereto. The slurry, or dispersion, is introduced into the inside of basket 1 while the basket is rotating. Any convenient means (not shown) can be employed for this introduction. The catalyst particles are forced against the wire mesh screen side 4 of the basket to form catalyst layer 5. The liquid and catalyst particles which pass through wire mesh 4, are removed from container 2 such as through line 8. With basket 1 rotating, a solution of n-propylene in an inert liquid medium such as n-hexane is contacted with the outside of basket wall 4, such as by spraying the solution at low velocity through spray-head 6. Propylene polymers form on the outer surface of catalyst bed 5 and are oriented outwardly therefrom.

Polypropylene can be removed from the catalyst by means as above described, such as by rotating basket 1 at a speed sufficient to cause cleavage of the polymer. A doctor blade (not shown) can be positioned adjacent basket 1, as above described, for removal of the polymer. Other means can be used to remove, or assist in removing, the polymer. For example, ultrasonic waves, especially those having a frequency of from about 100 to 500 kc./s. (kilocycles per second), used intermittently or continuously, assist in the polymer removal. The optimum speed of rotation of the basket will vary according to the particular procedure used, and can be readily determined. Polymer is recovered from container 2 through line 8 and passed through separator 9 wherein separation is performed as above described.

In order to illustrate a specific embodiment of the process of the invention, a slurry is prepared by dispersing 30 parts of titanium trichloride in 100 parts of n-hexane. As used herein "parts" means parts by weight. To the dispersion is added 5 parts of aluminum triisopropyl with agitation. The resulting slurry is introduced, under anhydrous and oxygen-free conditions, into the inside of a centrifuge basket constructed of a fine wire mesh screen while the basket is rotating at about 1,200 r.p.m. (revolutions per minute). A catalyst bed is formed on the screen having a thickness of about 0.2 cm., it being understood that a portion of the catalyst particles extend into the interstices of the wire mesh screen. With continued rotation of the basket, a solution of 1 part of propylene in 5 parts of n-hexane is contacted with the outer portion of the basket by spraying the solution against the outer surface at low velocity so that the catalyst bed is not disturbed. The rate of introduction of propylene is about 400 parts per hour. The speed of rotation of the basket is maintained at about 1,200 r.p.m. After operation for about 15 minutes, the speed of rotation is increased to about 10,000 r.p.m. for about 1 minute, after which the speed is decreased to the original value. Polypropylene as a slurry in n-hexane is recovered from the bottom of the container, about 80 parts of solid polymer product being recovered. The polymer product has a molecular weight of about 150,000 and a density of about 0.91.

Other embodiments, as above described, give substantially equivalent results in the process of the invention. Still other embodiments will be apparent to those skilled in the art. For example, the activator employed can be contacted with the catalyst as a solution with the olefin in the liquid reaction medium employed, and occasional injection of a small quantity of activator by this means gives good results, especially where continuous operation for substantial periods of time are used. Also, continuous injection of the olefin is not essential where the polymerization is performed under relatively high pressures, since the olefin rapidly dissolves in the liquid reaction medium. It is preferred, however, to keep the catalyst bed wet with the liquid medium during polymerization.

Solid polymer products of the invention are useful for the preparation of containers for corrosive fluids, conduits for the transportation of liquids, films for packaging food materials, and the like. Such articles can be prepared by molding, extrusion or other fabrication processes.

The invention claimed is:

1. Process for the preparation of solid polymers of normally gaseous olefins which comprises forming a bed of solid catalyst particles consisting of the reaction product of titanium trichloride and an aluminum alkyl on the inner periphery of a centrifuge basket formed of porous mesh screen having openings smaller than the diameter of said catalyst particles whereby to retain the particles within the basket, contacting the outer surface of said bed, under polymerizing conditions including a temperature of from about 0° C. to about 170° C., and a pressure of from about atmospheric to about 5,000 p.s.i.g., with a normally gaseous olefin selected from the group consisting of ethylene and propylene in an inert liquid reaction medium while rotating said basket at a speed sufficient to orient polymers of said olefin outwardly therefrom, and cleaving the so-formed polymers from the catalyst bed.

2. Process according to claim 1 wherein said olefin is ethylene.

3. Process according to claim 1 wherein said olefin is propylene.

4. Process according to claim 1 wherein said olefin is a mixture of ethylene and propylene.

5. Process according to claim 1 wherein the polymer is cleaved from the catalyst bed by centrifugal force.

6. Process according to claim 1 wherein the polymer is cleaved from the catalyst bed by shearing force.

References Cited in the file of this patent
UNITED STATES PATENTS 2,418,797    Voorhees _____ Apr. 8, 1947

OTHER REFERENCES

Natural and Synthetic High Polymers (second edition), 1950 by K. H. Meyer (pages 146–147).